United States Patent
Kameya

(10) Patent No.: US 9,419,680 B2
(45) Date of Patent: Aug. 16, 2016

(54) PASSIVE EQUALIZER

(71) Applicant: MATSUE ELMEC CORPORATION, Matsue-shi, Shimane (JP)

(72) Inventor: Masaaki Kameya, Matsue (JP)

(73) Assignee: MATSUE ELMEC CORPORATION, Matsue-shi (JP)

( * ) Notice: Subject to any disclaimer, the term of this patent is extended or adjusted under 35 U.S.C. 154(b) by 64 days.

(21) Appl. No.: 14/567,336

(22) Filed: Dec. 11, 2014

(65) Prior Publication Data

US 2015/0171920 A1 Jun. 18, 2015

(30) Foreign Application Priority Data

Dec. 12, 2013 (JP) ................. 2013-256591

(51) Int. Cl.
*H01P 3/14* (2006.01)
*H04B 3/14* (2006.01)

(52) U.S. Cl.
CPC ........................... *H04B 3/14* (2013.01)

(58) Field of Classification Search
CPC ............ H04B 3/04; H04B 3/14; H04B 3/144; H04B 3/147; H04B 7/005; H01P 9/003
USPC ....................................................... 333/28 R
See application file for complete search history.

(56) References Cited

U.S. PATENT DOCUMENTS 3,562,417 A * 2/1971 Poppa .................. H03H 7/0169
  333/170
2009/0219117 A1* 9/2009 Colussi .................... H04B 3/14
  333/28 R
2015/0288341 A1* 10/2015 Kameya .................. H04L 25/03
  333/28 R

FOREIGN PATENT DOCUMENTS

JP  2010-268154 A  11/2010

OTHER PUBLICATIONS

"Construction of an integrated circuit system utilizing a communication/signal processing technique for Multiple-Valued Code-Division Multiple Access Techniques for Intra-Chip Communication", Telecommunications Advancement Foundation, 2008, pp. 603-610, No. 23, cited in the specification.

* cited by examiner

*Primary Examiner* — Stephen E Jones
(74) *Attorney, Agent, or Firm* — Westerman, Hattori, Daniels & Adrian, LLP

(57) ABSTRACT

Series resistance Rs is connected in series between an input terminal 1 and an output terminal 3, and a resonant circuit 11 including an inductor L1 and a capacitor C1, and a resonant circuit 13 including an inductor L3 and a capacitor C3 are connected between the input terminal 1 and the output terminal 3, in parallel to the series resistance Rs. One end of a shunt resistance R1 is connected to a connection point P1 of the inductor L1 and the capacitor C1, and the other end is connected to a ground destination. One end of a shunt resistance R3 is connected to a connection point P3 of the inductor L3 and the capacitor C3, and the other end is connected to the ground destination.

5 Claims, 13 Drawing Sheets horizontal axis: 20ps/div, vertical axis: 25mV/div horizontal axis: 12.5ps/div, vertical axis: 25mV/div horizontal axis: 12.5ps/div, vertical axis: 25mV/div

PRIOR ART

PRIOR ART horizontal axis: 20ps/div, vertical axis: 25mV/div

PRIOR ART horizontal axis: 12.5ps/div, vertical axis: 25mV/div

PRIOR ART

PASSIVE EQUALIZER

BACKGROUND

1. Technical Field

The present invention relates to a passive equalizer such as a waveform equalization circuit, and particularly relates to a passive equalizer capable of suppressing an influence of a transmission loss and a multiple reflection in a serial transmission of an ultrafast signal exceeding 10 Gbit/second.

2. Description of Related Art

In the serial transmission of the ultrafast signal exceeding 10 Gbit/second, an influence of an output capacitance of a signal source IC and an input capacitance of a receiver IC is easily received, due to a high frequency of the signal, thereby easily generating a transmission loss and a multiple reflection which are caused by an impedance mismatch.

In addition, a pulse width of a transmission signal is dynamically changed by data content. Therefore particularly 1 unit interval (UI) signal which is minimum pulse width data generating "0" or "1" once, has a highest frequency, and is most strongly influenced by the transmission loss and the multiple reflection.

Meanwhile, signals such as 2 UI signal in which "0" and "1" are continuous twice, and 3 UI signal in which and "1" are continuous three times, are less influenced by the transmission loss and the multiple reflection, because the frequency of the signal becomes lower as the unit interval becomes larger.

Thus, in the transmission signal, decrease in amplitude which is caused by the transmission loss, and a fluctuation of a rise/fall edge which is caused by the multiple reflection, are generated in different amounts for every unite interval, thus forming a state in which an eye pattern is closed and such a state is a factor of causing a bit error.

Note that the eye pattern is the pattern obtained by repeatedly plotting a random data signal waveform in the same plot area for every 2 UI, so as to be superposed and displayed, wherein a widely opened state of an area surrounded by the rise/fall edge, namely an open state of the eye pattern is preferable.

As a means for opening the eye pattern closed by such a transmission loss, a passive equalizer as shown in non-patent document 1, namely a continuous time linear equalizer (CTLE: Continuous Time Linear Equalizer) are frequently used.

Further, as a method for recovering a deterioration of the eye pattern due to a simultaneous generation of the transmission loss and the multiple reflection, the receiver equalizer as shown in patent document 1 is proposed.

Patent Document 1: Japanese Patent Laid Open Publication No. 2010-268154

Non-Patent Document 1: "Construction of an integrated circuit system utilizing a communication/signal processing technique for Multiple-Valued Code-Division Multiple Access Techniques for Intra-Chip Communication" by Telecommunications Advancement Foundation (Research investigation report No. 23 2008, p603)

As shown in FIG. 10, non-patent document 1 teaches a passive equalizer in which a high pass filter including an inductor L21 and a capacitor C23 configured to allow only a desired high frequency component to bypass an attenuator, is respectively parallel-connected to an attenuator composed of resistances R11, R13, and R15 which are connected between an input terminal 1 and an output terminal 3. Such a passive equalizer has a relatively simple structure, and therefore can be manufactured at a low cost, and appears on the market widely.

Although the inductor L21 in FIG. 10 is omitted in the non-patent document 1, the inductor L21 actually exists because there is a residual inductance component, etc., on a connection line to the capacitor C23.

Then, a series resonant circuit is formed by the inductor L21 and the capacitor C23, and a transmission characteristic of a minimum loss at a resonant frequency of the series resonant circuit is realized.

However, even in a case of the same resonant frequency, as shown in FIG. 11, difference is generated in the transmission characteristic S21 depending on a combination of constants of the inductor L21 and the capacitor C23. When a residual component level of the inductor L21 is an extremely small value such as 0.5 nH, the characteristic is shown by curve A with a broad peak, and when the inductance value of the inductor L21 is intentionally set to be large like 5 nH, the characteristic is shown by curve B with a steep peak. FIG. 11 shows a case that the constant is set for a transmission signal of 10 Gbit/second.

A conventional passive equalizer shown in FIG. 10 has a transmission characteristic contrary to the transmission loss, and an object of such a passive equalizer is to realize a flat transmission characteristic by canceling the characteristic curve with the characteristic curve of the transmission loss, wherein the transmission loss shows a monotonously decreasing curve, and the characteristic of the curve A with broad peak is obtained as the transmission characteristic requested for the conventional passive equalizer.

However, if the passive equalizer of FIG. 10 is inserted into the transmission line in which multiple reflection occurs, it is difficult to consider that the passive equalizer of curve A is more suitable.

FIG. 12 shows an eye pattern at a receiving terminal when the passive equalizer having the characteristic of FIG. 11 is inserted into the transmission line in which the multiple reflection and the transmission loss occur simultaneously. According to FIG. 12, the eye pattern with small jitter at the rise/fall edge can be obtained in the passive equalizer of curve B.

However, the passive equalizer of curve B has unsuitable transmission characteristic for compensating the transmission loss, thereby making an opening of the eye pattern incomplete. Namely, the passive equalizer shown in FIG. 10 has a problem that there is no coexistence of the compensation for the transmission loss and the compensation for the multiple reflection.

In addition, due to a steep peak of the characteristic, the passive equalizer of characteristic B has a problem that when error is generated in the constants of the inductor L21 and the capacitor C23, the peak frequency is deviated, and the compensation cannot be done at a desired frequency.

For the reason described above, the conventional passive equalizer is easily influenced by the multiple reflection, but there is no choice to use the passive equalizer of characteristic A.

In addition, when such a passive equalizer is miniaturized, decrease of capacitance cannot not be prevented, due to a reduction of an electrode size of the capacitor C23, thus involving a problem that the conventional passive equalizer has a structure disadvantageous for miniaturization.

Meanwhile, the structure of the passive equalizer of patent document 1 is extremely simple, and an excellent waveform correction can be realized even for a high speed transmission signal of about 10 Gbit/second. However, there is an impedance mismatch state at the 1 UI frequency, and if the transmission signal of a faster transmission speed such as 16 Gbit/second or more for example is transmitted for generating a reflection wave from the passive equalizer itself, there is a possibility that the multiple reflection cannot be sufficiently removed.

For example, FIG. 13 shows the eye pattern in a case that the passive equalizer of patent document 1 is inserted into the transmission line of 16 Gbit/second in which the multiple reflection and the transmission loss are generated. Although minimum improvement of the eye pattern can be realized, this is the eye pattern having much room for improvement due to many jitters.

In order to solve the abovementioned problem, the present invention is provided, and an object of the present invention is to provide a passive equalizer suitable for a miniaturized chip component and capable of recovering deterioration of an eye pattern due to transmission loss and multiple reflection, in a ultrafast serial transmission, and particularly in a serial transmission of a ultrafast signal exceeding 10 Gbit/second.

SUMMARY OF THE INVENTION

In order to solve the abovementioned subject, there is provided a passive equalizer according to claim 1 of the present invention, including:

a first series resistance connected in series between an input point and an output point;

a first inductor with one end connected to the input point;

a first capacitor connected between the other end of the first inductor and the output point;

a second capacitor with one end connected to the input point;

a second inductor connected between the other end of the second capacitor and the output point;

a first shunt resistance connected between a connection point of the first inductor and the first capacitor, and a first ground destination; and a second shunt resistance connected between a connection point of the second capacitor and the second inductor, and a second ground destination.

There is provided the passive equalizer according to claim 2 of the present invention, wherein the first inductor is divided into a plurality of first division points, and similarly to the first inductor, the second inductor is divided into the second division points of the same number as the first division points, and a third capacitor is connected between the first division points and the second division points.

There is provided the passive equalizer according to claim 3 of the present invention, wherein the first inductor and the second inductor are closely disposed in parallel to each other, and first, second, and third capacitors are formed in a manner of distributed constants between conductors forming the first and second inductors.

There is provided the passive equalizer according to claim 4 of the present invention, wherein the first ground destination and the second ground destination are ground terminals, a circuit ground or a power supply line.

There is provided the passive equalizer according to claim 5 of the present invention, wherein a pair of same composition is arranged for differential signals, and the first ground destinations and the second ground destinations of each pair are connected to each other.

The passive equalizer according to claim 1 of the present invention is configured including the first series resistance, the series circuit of the first inductor and the first capacitor, the series circuit of the second capacitor and the second inductor which are respectively parallel-connected between the input point and the output point, and the first shunt resistance connected between the connection point of the first inductor and the first capacitor and the first ground destination, and the second shunt resistance connected between the connection point of the second capacitor and the second inductor and the second ground destination. Therefore, the effect is that the deterioration of the eye pattern due to the transmission loss and the multiple reflection can be recovered in the ultrafast serial transmission and particularly in the serial transmission of the ultrafast signal exceeding 10 Gbit/second, and therefore the passive equalizer of claim 1 is suitable for the miniaturization of the chip component.

The passive equalizer according to claim 2 of the present invention is configured so that the first inductor is divided into a plurality of first division points, and the second inductor is divided similarly to the first inductor into the second division points of the same number as the first division points, and the third capacitor is connected between the first division points and the second division points. Therefore, the effect is that the third capacitor can be configured in a manner of distributed constants between the first and second inductors, and between the division points.

The passive equalizer according to claim 3 of the present invention is configured so that the first, second, and third capacitors are formed in the manner of distributed constants between conductors forming the first inductor and the second inductor which are closely disposed in parallel to each other. Therefore, the effect is that the first to third capacitors are not required to be prepared as individual constitutional components, and miniaturization is easy at a low cost.

The passive equalizer according to claim 4 of the present invention is configured so that the first ground destination and the second ground destination are formed by ground terminals, the circuit ground or the power supply line. Therefore, the effect is that such a passive equalizer can be used not only for a single ended transmission but also for a differential transmission.

The passive equalizer according to claim 5 of the present invention is configured so that pairs of the same circuit are arranged as the differential signals, and the first ground destinations and the second ground destinations of each pair are connected to each other. Therefore, in the differential transmission, the passive equalizer can be constituted without ground terminals, and insulation can be easily secured.

DETAILED DESCRIPTION OF THE INVENTION

Embodiments of the present invention will be described hereafter, with reference to the drawings.

Figure 1:
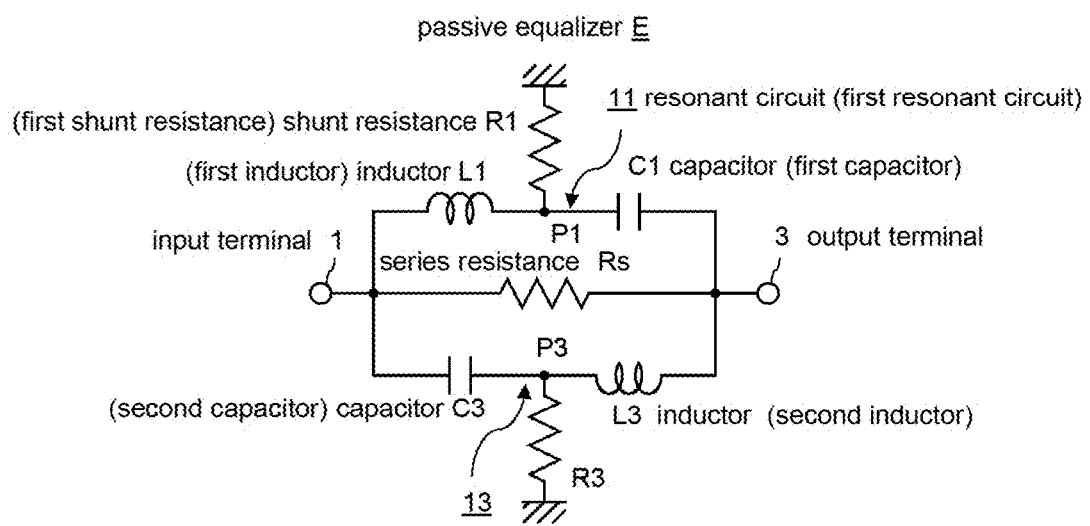
FIG. 1 is a circuit view showing a passive equalizer according to a first embodiment of the present invention.

FIG. 1 is a circuit view showing a passive equalizer according to a first embodiment of the present invention.

In FIG. 1, a series resistance Rs, resonant circuit 11 including an inductor (first inductor) L1, and a capacitor (first capacitor) C1 connected thereto in series, and further a resonant circuit 13 including a capacitor (second capacitor) C3 and an inductor (second inductor) L3 connected thereto in series, are connected between an input terminal 1 and an output terminal 3.

The inductor L1 is disposed at the input terminal 1 side, and the inductor L3 is disposed at the output terminal 3 side, and the capacitor C1 is disposed at the output terminal 3 side, and the capacitor C3 is disposed at the input terminal 1 side. The series resistance Rs and the resonant circuits 11 and 13 are connected in parallel to each other between the input terminal 1 and the output terminal 3.

One end of the shunt resistance (first shunt resistance) R1 is connected to a connection point (first connection point) P1 of the inductor L1 and the capacitor C1, and the other end of the shunt resistance R1 is connected to a first ground destination (ground point).

One end of the shunt resistance (second shunt resistance) R3 is connected to a connection point (second connection point) P3 of the inductor L3 and the capacitor C3, and the other end of the shunt resistance R3 is connected to a second ground destination (ground point). In the first embodiment, both of the first and second ground destinations are circuit grounds.

A π-type attenuator is constituted for direct current (DC) by the series resistance Rs and the shunt resistances R1 and R3. For example, if the characteristic impedance of a transmission line is set to 50 ohms and DC attenuation is set to 6 dB, a resistance value of the series resistance Rs is 37 ohms, and resistance values of the shunts R1 and R3 are 150 ohms.

In the resonant circuit 11 and the resonant circuit 13, the same constant is not necessarily required to be set, and transmission characteristics can be adjusted by setting each constant separately. However, usually the constants between the inductors L1 and L3, and the capacitors C1 and C3 should be same, to prevent from increasing the kind of components.

Figure 2:
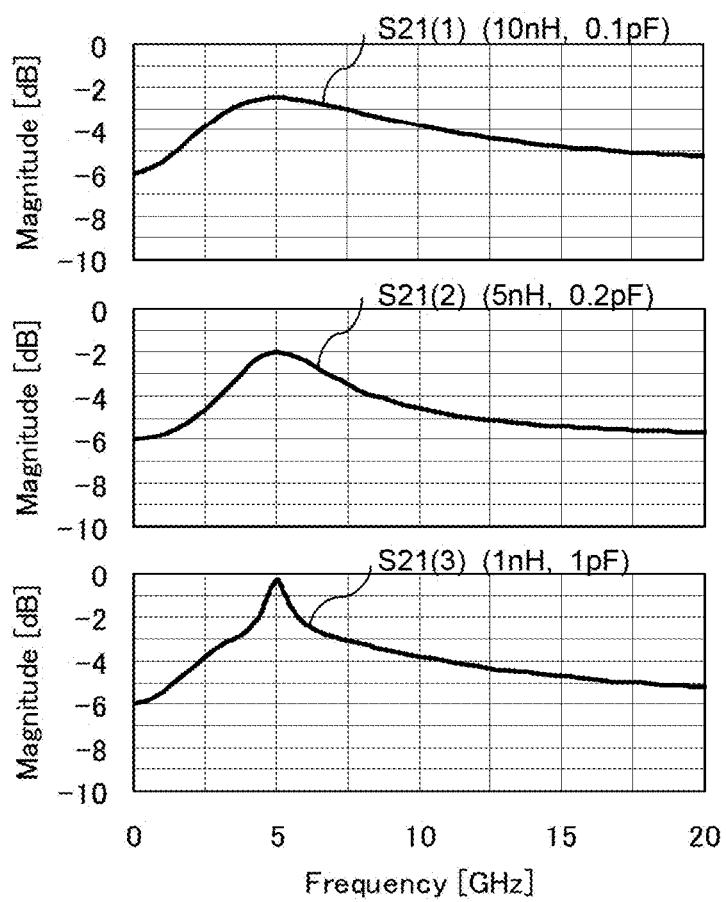
FIG. 2 is a view showing a frequency characteristic curve of the passive equalizer of FIG. 1.

FIG. 2 is a view showing a transmission characteristic curve of a passive equalizer E shown in FIG. 1, wherein peak frequency (resonant frequency) is set to 5 GHz. Each curve shown here is the curve formed under the following conditions.

Curve S21(1): inductors L1 and L3 are 10 nH, and capacitors C1 and C3 are 0.1 pF.

Curve S21(2): inductors L1 and L3 are 5 nH, and capacitors C1 and C3 are 0.2 pF.

Curve S21(3): inductors L1 and L3 are 1 nH, and capacitors C1 and C3 are 1 pF.

Figure 10:
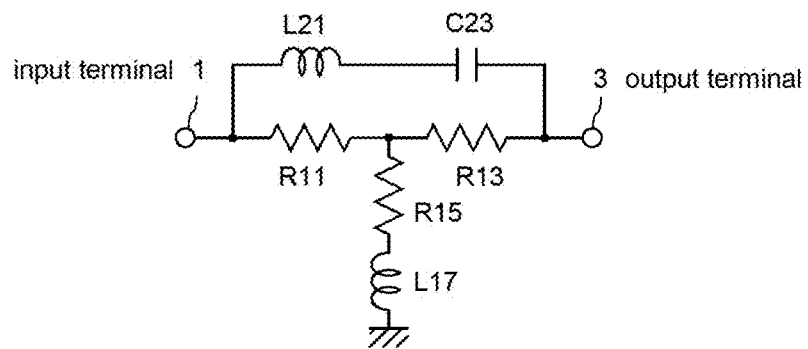
FIG. 10 is a view showing an equivalent circuit of a conventional passive equalizer.
Figure 11:
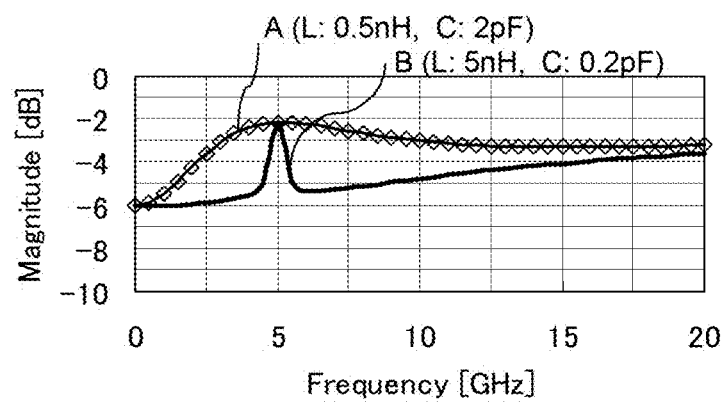
FIG. 11 is a view showing a frequency characteristic curve of the conventional passive equalizer shown in FIG. 10.

According to FIG. 2, it is found that as the values of the inductors L1 and L3 of the resonant circuits 11 and 13 are smaller, the characteristic in the vicinity of the resonant frequency shows a steep curve. It is found that the transmission characteristic curve of FIG. 2 shows a tendency opposite to the characteristic of the conventional passive equalizer shown in FIG. 10, namely opposite to the tendency of the characteristic in the vicinity of the resonant frequency showing a steep curve as the inductance value of the resonant circuit becomes larger (see FIG. 11).

Figure 3:
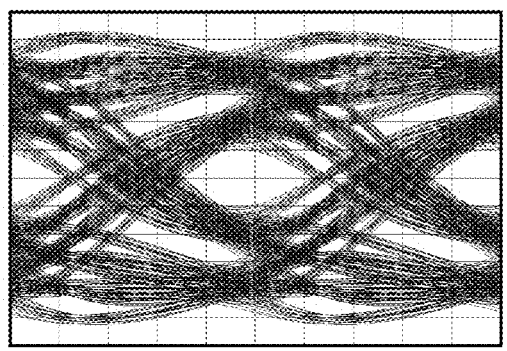
FIG. 3 is a view for the reference showing an eye pattern which is influenced by a transmission loss and a multiple reflection without the passive equalizer.

FIG. 3 is a view of an eye pattern showing a deteriorated state in which the transmission signal of 10 Gbit/second is influenced by the transmission loss and the multiple reflection.

Figure 4:
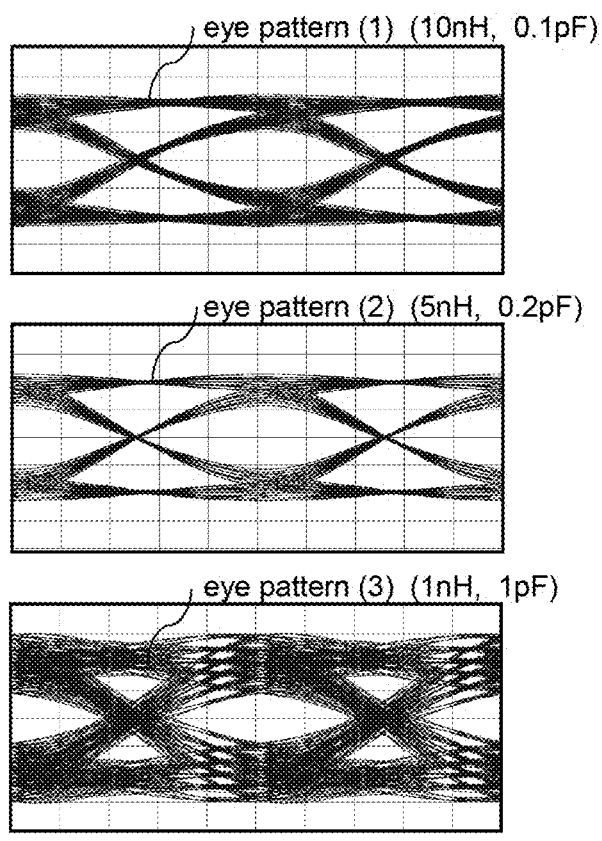
FIG. 4 is a view showing an eye pattern when the passive equalizer of FIG. 1 is used.

FIG. 4 shows an eye pattern when the passive equalizer E of FIG. 1 is inserted into the transmission line where the above-mentioned deterioration of the eye pattern occurs. Each eye pattern is formed corresponding to the transmission characteristic shown in FIG. 2 under the following conditions.

Eye pattern (1): inductors L1 and L3 are 10 nH, and capacitors C1 and C3 are 0.1 pF.

Eye pattern (2): inductors L1 and L3 are 5 nH, and capacitors C1 and C3 are 0.2 pF.

Eye pattern (3): inductors L1 and L3 are 1 nH, and capacitors C1 and C3 are 1 pF.

As is clarified from FIG. 4, a satisfactory eye pattern can be obtained when both of the inductors L1 and L3 are large values. In addition, a considerable improvement can be obtained compared with FIG. 12 showing the eye pattern obtained by the conventional passive equalizer, and it is found that the structure of the present invention is effective for recovering the eye pattern deteriorated due to multiple reflection.

Figure 12:
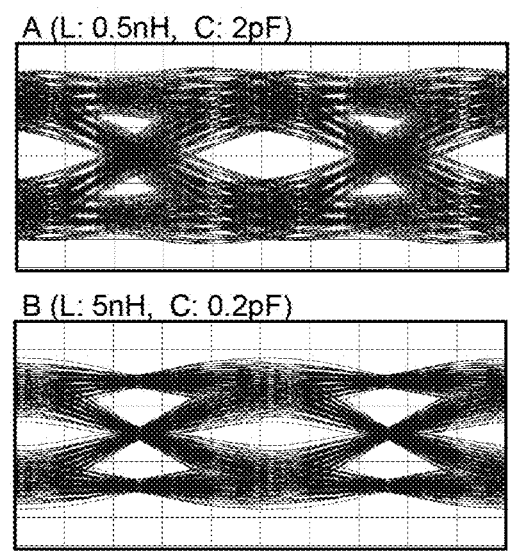
FIG. 12 is a view showing an eye pattern when the conventional passive equalizer of FIG. 10 is used.

As a matter of course, completely same conditions of transmission lines are used for obtaining the eye patterns of FIG. 4 and FIG. 12.

Figure 13:
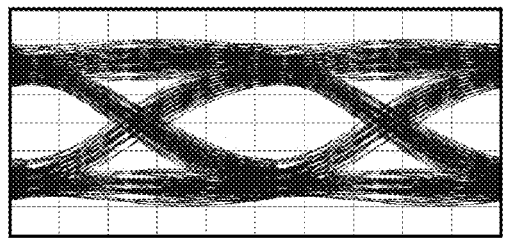
FIG. 13 is a view showing an eye pattern when the conventional passive equalizer is used.

Next, an eye pattern is shown in a case of properly selecting a constant of the passive equalizer E of FIG. 1 for the transmission signal of 16 Gbit/second, in comparison with the eye pattern obtained by the conventional equalizer shown in FIG. 13.

Figure 5:
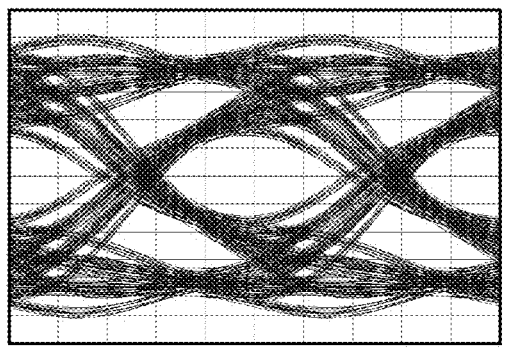
FIG. 5 is a view for the reference showing an eye pattern which is influenced by a transmission loss and a multiple reflection without the passive equalizer.
Figure 6:
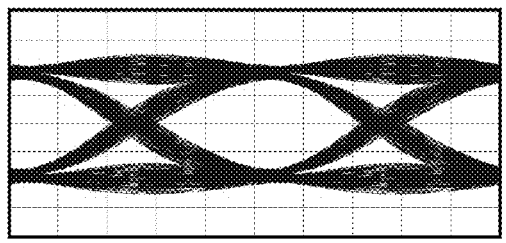
FIG. 6 is a view showing an eye pattern when the passive equalizer of FIG. 1 is used.

FIG. 5 is a view showing the eye pattern of the transmission signal of 16 Gbit/second which is deteriorated under an influence of the transmission loss and the multiple reflection, and FIG. 6 is a view showing the eye pattern when the passive equalizer E of FIG. 1 is inserted.

By comparing FIG. 6 and FIG. 13 regarding the transmission signal of 16 Gbit/second, it is found that the satisfactory eye pattern can be obtained by the passive equalizer E of the present invention, compared with the conventional passive equalizer.

Incidentally, as is clarified in FIG. 4, the structure that the inductance values of the inductors L1 and L3 are preferably large, if reversely said, the structure that the capacity of the capacitors C1 and C3 can be small, are advantageous for miniaturization of a component.

This is because when an internal conductor pattern becomes finer with miniaturization of the component, lines of inductors L1 and L3 become narrower even if an outer size of the whole body is small, and therefore the inductance value can be relatively easily maintained, and meanwhile the capacitance of the capacitors C1 and C3 can be small, and therefore there is less problem in miniaturizing the component.

Thus, the passive equalizer E of the present invention can be easily miniaturized, and this point can be an excellent characteristic compared with the conventional passive equalizer.

Thus, the passive equalizer E of the present invention shown in FIG. 1 includes the series resistance Rs connected in series between the input point 1 and the output point 3; the inductor L1 with one end connected to the input point 1; the capacitor C1 connected in series between the other end of the inductor L1 and the output point 3; the capacitor C3 with one end connected to the input point 1; the inductor L3 connected in series between the other end of the capacitor C3 and the output point 3; the shunt resistance R1 connected between the connection point P1 of the inductor L1 and the capacitor C1, and the circuit ground; and the shunt resistance R3 connected in common between the connection point P3 of the capacitor and the inductor, and the circuit ground.

Therefore, the present invention has an advantage that the deterioration of the eye pattern due to the transmission loss and the multiple reflection can be recovered in the ultrafast serial transmission, and particularly in the serial transmission of the ultrafast signal exceeding 10 Gbit/second, the passive equalizer having this structure is suitable for the miniaturization of the chip component.

Figure 7:
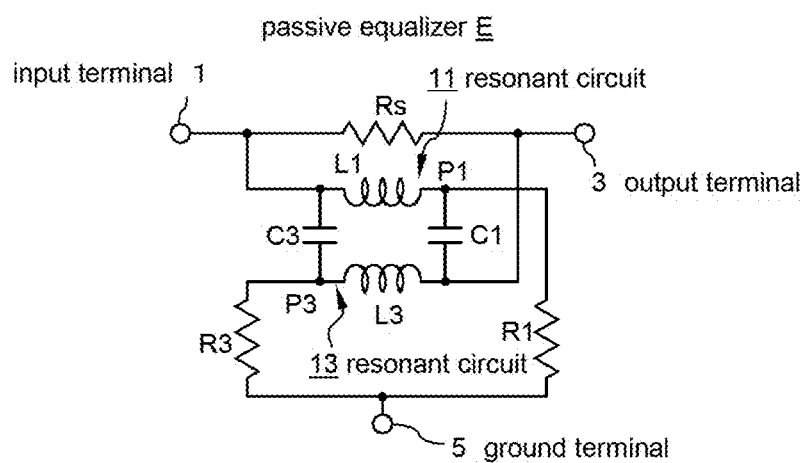
FIG. 7 is a circuit view showing a component arrangement of the passive equalizer of FIG. 1 organized and rewritten.

FIG. 7 shows the same circuit structure as the circuit structure of FIG. 1, wherein arrangement of the inductors L1 and L3, and the capacitors C1 and C3 are changed so as to be easy to be viewed. Further, the shunt resistances R1 and R3 are not directly connected to the circuit ground, but connected to the ground terminal 5 in common, when the passive equalizer E is set as one independent constitutional component.

The ground terminal 5 may be connected to the circuit ground, but sometimes is connected to a power supply line including a termination voltage line used for a ground destination of a termination resistor at the end of the transmission line, depending on the logic IC. In this case, a signal line is pulled up to the power supply line, and therefore the ground terminal of the passive equalizer E is also preferably connected to the same power supply line.

Further, as is clarified from FIG. 7, from the other viewpoint, an equilibrium ladder type equivalent transmission line is constituted by the inductors L1 and L3 and the capacitors C1 and C3.

Accordingly, the inductors L1 and L3, and the capacitors C1 and C3 can be replaced with a distributed constant ladder type equivalent transmission line or a lumped-constant equivalent circuit close thereto.

Figure 8:
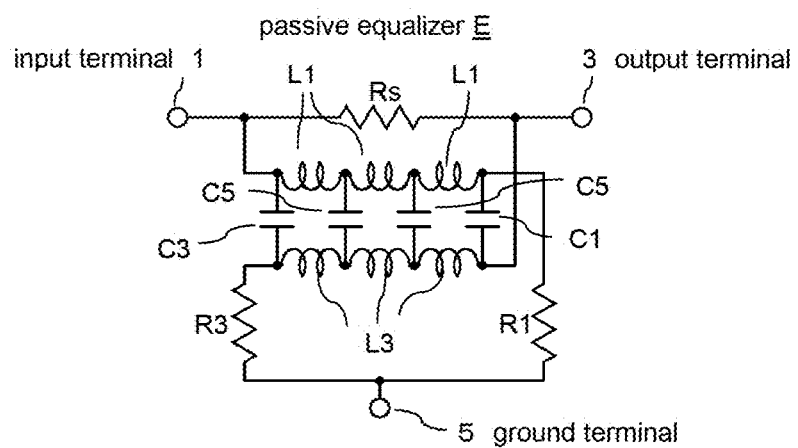
FIG. 8 is a circuit view showing a passive equalizer according to a second embodiment of the present invention.

FIG. 8 is a circuit view showing the passive equalizer E according to a second embodiment of the present invention.

Namely, in the circuit structure of FIG. 7, the inductors L1, 13, and the capacitors C1, C3 are replaced with the distributed constant ladder type equivalent transmission line or the lumped-constant equivalent circuit close thereto.

In other words, the structure is equivalent to the following structure: namely, the inductors L1 and L3 of FIG. 7 are divided into the same numbers of and plurality of numbers of first division points and second division points, and new capacitors (third capacitors) C5 are respectively connected to the first and second division points of the inductors L1 and L3 which are opposed to each other. Although not shown, similar transmission characteristics as FIG. 2 can be obtained.

With this structure, for example the inductors L1 and L3 are formed as opposed meander lines, and the capacitors C1, C3, and C5 can be arranged so as to be formed between conductors of the inductors L1 and L3 which are opposed to each other, thus realizing a simple structure.

Specifically, the capacitors C1 and C3 can be formed between input/output points of the inductors L1 and L3 or between conductors around here, and the capacitor C5 can be formed between conductors in a middle of the input/output points of the inductors L1 and L3. It can be considered that this structure is equivalent to the following structure: namely, there are a plurality of division points in the middle of the input/output points of the inductors L1 and L3, and a plurality of capacitors C5 are formed between these plurality of division points.

With this structure, there is no necessity for preparing the capacitors C1 to C5 as individual constitutional components, thus contributing to reduction of a cost and size of the component.

In FIG. 8, although the inductors L1 and L3 are divided into three division points respectively, any numbers of division points may be acceptable.

Further, in FIG. 8, the capacitor C5 is connected between the first division points and the second division points so as to form the ladder type equivalent transmission line. However, a lattice type equivalent transmission line may also be formed.

Figure 9:
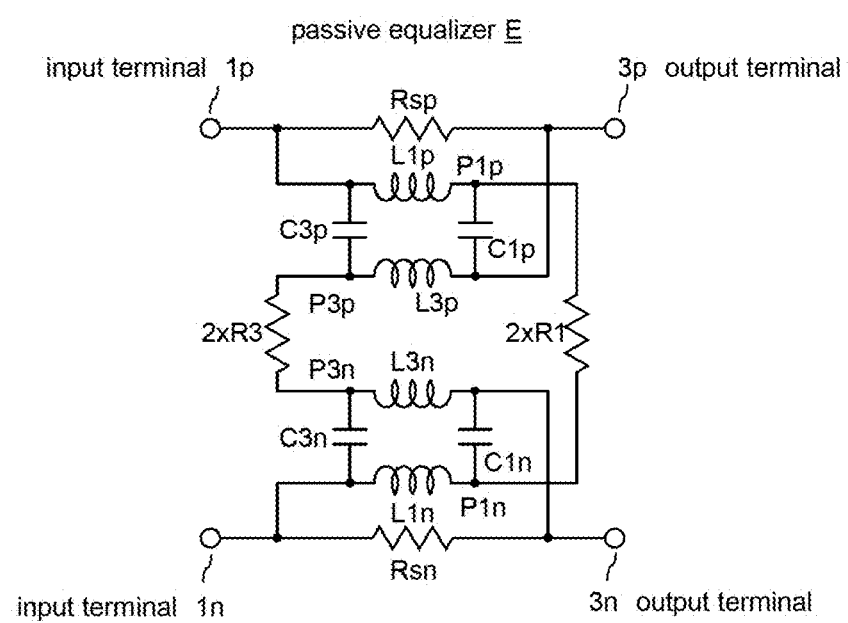
FIG. 9 is a circuit view showing a passive equalizer according to a third embodiment of the present invention.

FIG. 9 is a circuit view showing the passive equalizer E according to a third embodiment of the present invention.

All of the passive equalizers E described heretofore are formed as a single ended structure. However, FIG. 9 shows a structure of two sets of passive equalizers E of FIG. 7 arranged side by side.

Wherein, the ground destinations of the shunt resistances R1 and R3 are not the ground terminals, and the ground destinations of two sets of shunt resistances R1 and R3, which are formed as a pair for a differential line, are connected in common.

Thus, the shunt resistances are connected in series respectively, and a resistance value is rewritten to new double shunt resistances 2×R1 and 2×R3. The other signs and numerals are called P-phase as one line and n-phase as the other line for convenience, and a subscript p is added to the sign and numeral in the p-phase, and a subscript n is added to the sign and numeral in the n-phase, wherein since the p-phase and the n-phase are completely the same circuit, the characteristic is equivalent to the characteristic of FIG. 7 showing the single ended structure. Therefore, the characteristic is not shown.

However, the structure shown in FIG. 9 also has an advantageous point unlike the structure of the single ended. In FIG. 7 and FIG. 8 showing the single ended structure, there is also a problem that insulation between a signal line and the ground terminal is hardly secured, because a relatively low resistance is connected between the signal line and the ground terminal.

Meanwhile, in the structure of FIG. 9 for differential line, the shunt resistances 2×R1 and 2×R3 are connected between the differential signal lines, thus not requiring the ground terminal, and the insulation can be easily secured.

Incidentally, in the above description, a coupling between the inductors L1 and L3 is not particularly described. However, the inductors L1 and L3 should be close to each other for miniaturization, and therefore the coupling between the inductor L1 and the inductor L3 is inevitable.

For example, in the structure of FIG. 7, if there is a positive coupling between the inductors L1 and L3 which are opposed to each other, the inductance value between the inductors L1 and L3 is likely to be decreased, and if there is a negative coupling between them, the inductance value between the inductors L1 and L3 is likely to be increased. Therefore, a desired resonant frequency can be set by utilizing the coupling between the inductors L1 and L3.

Although a coupling is sometimes generated between differential pairs in a differential structure, such a coupling also contributes to increase/decrease of the inductance values of the inductors L1p, L1n, L3p, and L3n. Therefore, a desired resonant frequency may be set by utilizing the coupling.

Further, the passive equalizer of the present invention is suitable for a structure of housing in the same package together with a delay line and a common mode filter.

What is claimed is:

1. A passive equalizer, comprising:
   a first series resistance connected in series between an input point and an output point;
   a first inductor with one end connected to the input point;
   a first capacitor connected between the other end of the first inductor and the output point;
   a second capacitor with one end connected to the input point;
   a second inductor connected between the other end of the second capacitor and the output point;
   a first shunt resistance connected between a connection point of the first inductor and the first capacitor, and a first ground destination; and
   a second shunt resistance connected between a connection point of the second capacitor and the second inductor, and a second ground destination.

2. The passive equalizer according to claim 1, wherein the first ground destination and the second ground destination are ground terminals, a circuit ground or a power supply line.

3. The passive equalizer according to claim 1, wherein a pair of same composition is arranged for differential signals, and the first ground destinations and the second ground destinations of each pair are connected to each other.

4. The passive equalizer according to claim 1, wherein the first inductor is divided into a plurality of first division points, and similarly to the first inductor, the second inductor is divided into the second division points of the same number as the first division points, and a third capacitor is connected between the first division points and the second division points.

5. The passive equalizer according to claim 4, wherein the first inductor and the second inductor are closely disposed in parallel to each other, and first, second, and third capacitors are formed in a manner of distributed constants between conductors forming the first and second inductors.

* * * * *